United States Patent
Reinisch et al.

(10) Patent No.: US 10,077,051 B2
(45) Date of Patent: Sep. 18, 2018

(54) DRIFTING TRAINING ASSISTANCE SYSTEM FOR A MOTOR VEHICLE

(71) Applicant: Bayerische Motoren Werke Aktiengesellschaft, Munich (DE)

(72) Inventors: Philipp Reinisch, Kirchseeon (DE); Moritz Werling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/788,999

(22) Filed: Jul. 1, 2015

(65) Prior Publication Data

US 2015/0298702 A1 Oct. 22, 2015

Related U.S. Application Data

(63) Continuation of application No. PCT/EP2013/075763, filed on Dec. 6, 2013.

(30) Foreign Application Priority Data

Jan. 2, 2013 (DE) ........................ 10 2013 200 027

(51) Int. Cl.
| | |
|---|---|
| *B60W 10/04* | (2006.01) |
| *B60W 30/18* | (2012.01) |
| *B62D 15/02* | (2006.01) |
| *G09B 19/16* | (2006.01) |
| *B60T 8/1755* | (2006.01) |

(Continued)

(52) U.S. Cl.
CPC ... *B60W 30/18145* (2013.01); *B60T 8/17552* (2013.01); *B60W 10/04* (2013.01); *B60W 10/20* (2013.01); *B62D 15/025* (2013.01); *G09B 9/04* (2013.01); *G09B 19/16* (2013.01); *B60T 2210/36* (2013.01); *B60T 2260/02* (2013.01)

(58) Field of Classification Search
CPC ................................................ B60W 30/18145
See application file for complete search history.

(56) References Cited

U.S. PATENT DOCUMENTS

| | | | | |
|---|---|---|---|---|
| 4,821,606 A | * | 4/1989 | Leiber ................ | B60G 17/0195 180/197 |
| 4,974,875 A | * | 12/1990 | Sugasawa .......... | B60G 17/0162 280/5.506 |
| 6,226,581 B1 | | 5/2001 | Reimann et al. | |

(Continued)

FOREIGN PATENT DOCUMENTS

| | | |
|---|---|---|
| DE | 100 11 779 A1 | 6/2001 |
| DE | 101 30 659 A1 | 1/2003 |

(Continued)

OTHER PUBLICATIONS

International Search Report (PCT/ISA/210) dated Apr. 25, 2014 with English translation (seven pages).

(Continued)

*Primary Examiner* — Adam D Tissot
*Assistant Examiner* — Michael Andrew Berns
(74) *Attorney, Agent, or Firm* — Crowell & Moring LLP

(57) ABSTRACT

A drifting training assistance system is provided for a motor vehicle for learning drifting techniques required in high-performance driving training. The steering and the gas pedal movement, or the combined action thereof, is taken on and/or supported by a drifting assistance system.

13 Claims, 2 Drawing Sheets

(51) Int. Cl.
    *G09B 9/04*         (2006.01)
    *B60W 10/20*      (2006.01)

(56) References Cited

U.S. PATENT DOCUMENTS

| | | | |
|---|---|---|---|
| 6,637,543 B2 * | 10/2003 | Card | B62D 6/003 |
| | | | 180/410 |
| 6,793,234 B2 * | 9/2004 | Carlstedt | B62D 15/029 |
| | | | 180/446 |
| 7,165,644 B2 * | 1/2007 | Offerle | B60T 8/1755 |
| | | | 180/244 |
| 2008/0211651 A1 | 9/2008 | Beutnagel-Buchner et al. | |

FOREIGN PATENT DOCUMENTS

| | | |
|---|---|---|
| DE | 10 2008 029 894 A1 | 12/2009 |
| EP | 1 369 287 A2 | 12/2003 |
| EP | 1 484 234 A1 | 12/2004 |
| EP | 1 950 113 A1 | 7/2008 |
| EP | 2 147 842 A1 | 1/2010 |
| WO | WO 2013/001033 A1 | 1/2013 |

OTHER PUBLICATIONS

German Search Report dated Dec. 16, 2013 with partial English translation (10 pages).
German-language European Office Action issued in European Application No. 13 799 604.7 dated May 9, 2016 (six pages).
Velenis et al., "Steady-state drifting stabilization of RWD vehicles", Control Engineering Practice 19, Jul. 2011, pp. 1363-1376, Elsevier Ltd., XP 23308730A.

\* cited by examiner

DRIFTING TRAINING ASSISTANCE SYSTEM FOR A MOTOR VEHICLE

CROSS REFERENCE TO RELATED APPLICATIONS

This application is a continuation of PCT International Application No. PCT/EP2013/075763 filed Dec. 6, 2013, which claims priority under 35 U.S.C. § 119 from German Patent Application No. 10 2013 200 027.8, filed Jan. 2, 2013, the entire disclosures of which are herein expressly incorporated by reference.

BACKGROUND AND SUMMARY OF THE INVENTION

The present invention relates to a drifting training assistance system for learning the drilling technique in a motor vehicle.

One necessary part of a driver training course is drifting (e.g., in a circle), where the rear wheels are intentionally accelerated so intensely that the rear of the vehicle moves round and a great side slip angle is generated. This has to be learned without any support from an assistance system.

During drifting, a driver tries to cause his vehicle to oversteer, whilst maintaining control and keeping the same driving speed. During such driving maneuvers, the rear wheels have a larger slip angle than the front wheels.

During drifting, mostly light vehicles having rear-wheel drive with high engine power and torque are used. A rear-wheel drive offers the advantage of controlling the drill angle in a targeted manner via the spinning of the rear wheels, i.e. via a provoked oversteering, through sheer excess in engine power. Vehicles with a front-wheel drive are less suitable for drilling because they tend to understeer rather than oversteer during acceleration. In the case of a vehicle with front-wheel drive, however, oversteering can be generated b applying the handbrake. However, this is referred to as "slide" rather than "drift". These "slides", too are addressed by the present invention.

A further technique consists in causing the vehicle to carry out a reciprocating movement. In the course of this, the driver tries to drive in small serpentine lines, so that the rear of the vehicle breaks out in the case of a sudden and strong steering maneuver.

A further technique consists in briefly placing the rear axis of the vehicle on a grass surface next to the road. In the course of this, swinging motions of the vehicle build up in such a way that the rear slides over the surface next to the asphalt and thus loses its grip. As soon as the input drill angle has been reached, the vehicle is moved back onto the asphalt.

The handbrake (optionally electronic) itself can not only be used for initiating drifting, but can also be used for markedly prolonging a drifting process, by causing an instable driving condition, whilst the vehicle already tends to establish grip on the rear axis. A further possibility of using the handbrake is the reduction of excess speed between bend combinations. If, for example, a driver drifts around a bend in fourth gear and a bend requiring a drift in second gear follows, it makes sense to abruptly increase the drift angle prior to driving into the slower bend by means of the handbrake and thus to reduce the speed whilst sliding into the bend.

Taking bends (curves) using the drifting technique requires great skill, but in addition affords the security of controlling the vehicle even in critical situations. Corresponding drifting skills can be obtained in special courses that are offered.

However, it is in particular the simultaneous steering and accelerating that causes the greatest problems to many course participants, even after many training sessions, so that oftentimes a satisfying learning outcome has not been achieved at the end of the course.

It is therefore the object of the present invention to provide a remedy for this.

Accordingly, to the invention, this and other objects are achieved in a drifting training assistance system for a motor vehicle for learning the drifting technique (e.g. in a circle) required in high-performance driving training by having both the steering activity and the gas pedal movement, or the combined action thereof, taken over and/or supported by at least one drifting assistance system. Alternatively, also handling instructions of an optical and/or acoustic type may be provided to the driver.

As a result of the measures according to the invention, it becomes possible for the course participant to obtain to demonstration from the assistance system of the steering movements required for drifting directly from behind the steering wheel. Subsequently, they can learn the steering and accelerating independently from each other and can in this way obtain an at least satisfactory learning success by the end of the course.

According to an advantageous development, the drifting assistance system continues the course curvature of a vehicle-fixed reference point that is available during the activation thereof and is determined from the yaw rate, the lateral acceleration or from UPS sensors, by way of automatic steering movements.

The automatic steering movements are advantageously continued even if the rear of the motor vehicle breaks out as a result of an acceleration that is administered by the driver or by the drifting assistance system itself.

In order to adapt the course of the vehicle to the local conditions of the training ground, it is provided according to a preferred embodiment that the controlled course curvature can be adapted via a controller.

Alternatively, also the manual torque applied b the driver may be measured, on the basis of which the required course curvature (e.g. by up-integration of the signed manual torque) is corrected. The driver then has the possibility of following the automatic steering movements with his hands and to push "against the controller" in a dosed manner only in the case of as desired course correction corresponding to the required direction.

According to an advantageous development, the drifting assistance system determines the side slip angle of the center of gravity of the vehicle that is present during the activation thereof and is determined from the steering angle, the yaw rate, the lateral acceleration or reference sensors such as GPS, and controls the estimated side slip angle to a required value adjustable by the driver by way of acceleration or deceleration.

An advantageous development relates, rather than to active driver interventions, to the acoustic or optic representation of the controller actuating variables. If the driver follows these handling instructions (e.g. the required and the actual position of the steering wheel angle in the head-up display, the difference between the required and the actual gas angle using a pitched tone), the same desired system behavior is represented as if the controller directly accessed the steering wheel or the accelerator, at the same time with a higher proportion of self-participation by the driver.

Preferably, the drifting assistance system can be activated by way of a kick down of the accelerator pedal.

According to an advantageous development, important driving data such as speed, yaw rate, side slip angle, etc. are recorded so as to enable the maneuvers made to be evaluated and analyzed together with a driving instructor.

Advantageously, the drifting training assistance system can also be obtained as special equipment for production vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
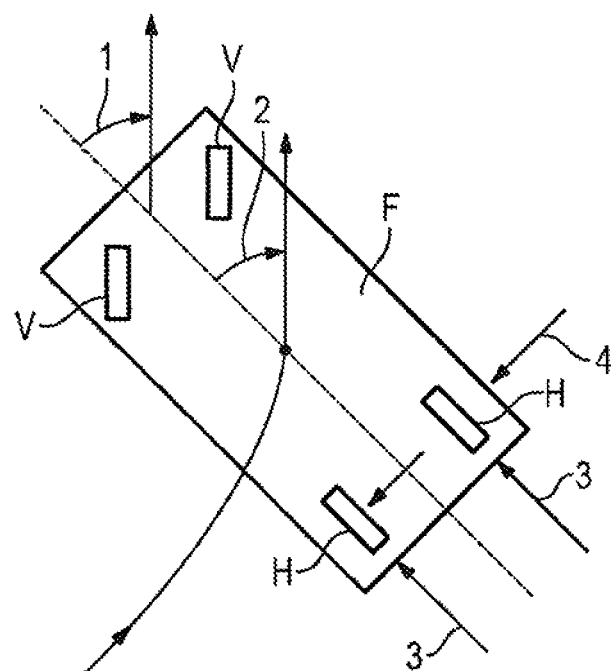
FIG. 1 is a schematic block diagram showing the forces acting on a vehicle during a drifting maneuver.

In order to learn the drifting (e.g. in a circle) required in high-performance driving training, both the steering activity 30 and the gas pedal movement 40, or the combined action thereof, are taken over and/or supported by a drifting assistance system 20 of a vehicle 10 according to the invention.

In the course of this, the fact is utilized that in the case of vehicles with rear-wheel drive, the slide angle of the front wheels compared to that of the rear wheels is very small during circle drifting. Moreover, the yaw rate of the vehicle may be measured very accurately, so that an approximate estimation of the side slip angle of the center of gravity of the vehicle can be made therefrom without any expensive inertial or GPS sensors.

On the basis of the yaw rate and the side slip angle, the drifting assistance system 20 can now influence both the steering activity 30 and the gas pedal movement 40 or the combined action thereof.

If steering control is taken over by the drifting assistance system, the course curvature of the vehicle (estimated from the yaw rate) as initially available during activation is continued by way of automatic steering movements even if the rear breaks out (as a result of an acceleration dosed by the driver or by the system itself). In order to stabilize the course curvature, the instantaneous curvature of an vehicle-fixed reference point is, in principle, suitable. However, also the so-called center of percussion is advantageous, which is located at a distance of $d=J/(m*1\_h)$ [$J$=yaw inertial torque of the vehicle, $m$=vehicle mass, $l\_h$ rear axle distance from the center of gravity]

in front of the center of gravity of the vehicle. The reason for this is that a change in the lateral rear axle force does not lead to a change in lateral acceleration at this point, and thus the course may be instantaneously maintained also in the case of a sudden occurrence of a sliding movement of the rear axis, and steering intervention may be carried out later.

An adaptation of the controlled course curvature can be carried out via a controller, so that the driver has the possibility of adapting, by carrying out steering movements on the controller, the vehicle course to the local conditions of the training around. An alternative is the up-integration of the manual torque applied by the driver in terms of an admittance or impedance control.

A similar situation applies in the case of automatic drive control, which controls the estimated side slip angle to a driver-adjustable required value by way of accelerating or decelerating. Steering algorithms that are suitable for this purpose are in particular robust control approaches with a variable control structure (e.g. so-called sliding mode controls), which can compensate fluctuating route parameters (e.g. ground conditions).

For activating the drifting assistance system, it makes sense if the driver carries out a brief kick-down of the accelerator. Alternatively, also an activation of the drifting assistance system by a short pivoting movement on the gear lever of the vehicle is contemplated.

The recording of important driving data such as speed, yaw rate and side slip angle allows a visualization of the maneuver on the computer, so that it can be analyzed together with a driving instructor. The evaluation of the measurement data may be carried out automatically, e.g. using a points award system.

It is contemplated that such a drifting trainer can also be sold as special equipment for a production vehicle.

FIG. 1 shows the forces acting on a vehicle F during a drilling maneuver. The front wheels V are turned at a steering angle 1 to the longitudinal axis of the vehicle due to a steering movement, while the vehicle moves laterally under a side slip angle 2. During acceleration, a drive force 3 is applied to the rear wheels H, which at the same time are subject to a lateral guiding force 4.

Figure 2:
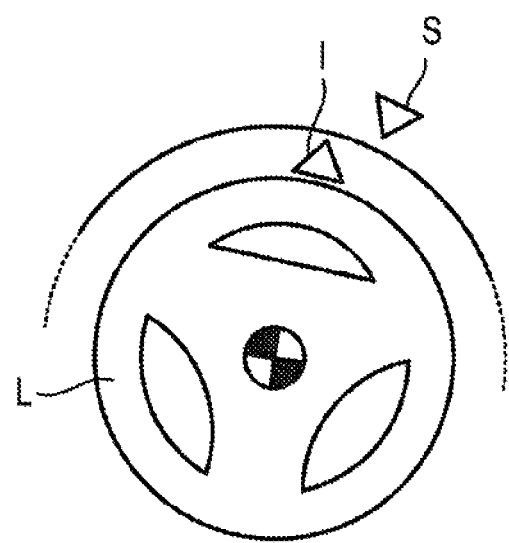
FIG. 2 is a schematic view of an optical display system for a drifting training assistance system according to an embodiment of the invention.
Figure 3:
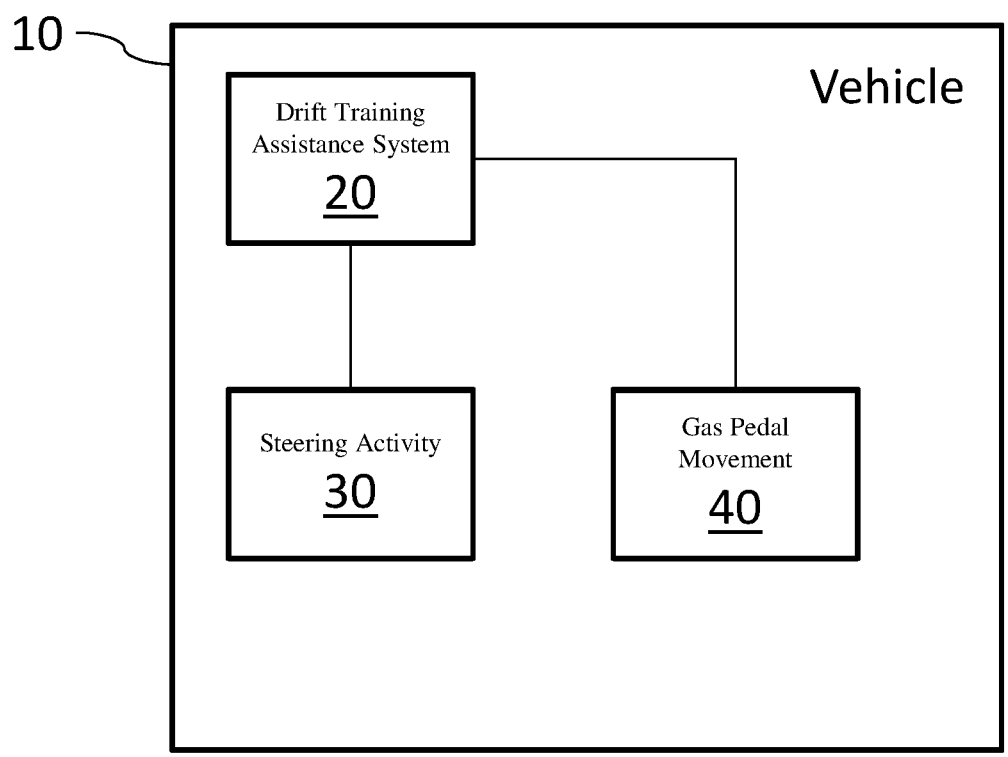
FIG. 3 depicts a conventional vehicle having a drifting training system according to an embodiment of the invention.

FIG. 2 illustrates a display concept that indicates to the driver in which direction he has to move the steering wheel L in order to carry out an optimal drifting maneuver. In the embodiment example shown, the required steering angle S and the actual steering angle I do not coincide because the two markers are not in alignment. To ensure that the required steering angle S and the actual steering angle I coincide, the driver would have to turn the steering wheel L towards the right, so that the two markers are brought in alignment with each other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A training system for a motor vehicle for learning a drifting technique required during high-performance driver training, the system comprising:
   a drifting assistance system comprising:
      sensors for sensing a steering angle, a yaw rate and a lateral acceleration of the motor vehicle; and
      a controller configured to control respective positions of a steering wheel and an accelerator pedal of the motor vehicle so as to thereby cause the motor vehicle to automatically execute the drifting technique along a course curvature that is estimated by the controller based on the sensed steering angle, yaw rate and lateral acceleration of the motor vehicle, wherein the at least one of the steering wheel and accelerator pedal is controlled by the controller to provide resistance feedback to a driver for learning the drifting technique, and wherein the course curvature is adaptable via a manually applied torque.

2. The training system according to claim 1, wherein the automatic execution of the drifting technique is continued even if a rear of the motor vehicle breaks out as a result of an acceleration dosed by the driver or by the drifting assistance system.

3. The training system according to claim 1, wherein the controller determine a side slip angle of a vehicle-fixed reference point as estimated during activation of the drifting assistance system, and controls the estimate side slip angle to a driver-adjustable required value by way of acceleration or deceleration of the motor vehicle.

4. The training system according to claim 1, wherein actuating variables of a controller of the drifting assistance system are acoustically and/or optically representable to the driver.

5. The training system according to claim 1, wherein the drifting assistance system is activatable by carrying out a kick down of the accelerator pedal.

6. The training system according to claim 1, wherein the drifting assistance system is configured to record driving data parameters and to allow an analysis of driven maneuvers based on the recorded driving data parameters.

7. The training system according to claim 6, wherein the driving data parameters comprise speed, yaw rate, and side slip angle.

8. The training system according to claim 1, wherein the drifting assistance system is configured to enable, by way of the manually applied torque, a driver to correct the automatic steering movements.

9. A training method for a driving maneuver of a motor vehicle, the method comprising:

activating a drifting assistance system, comprising sensors for sensing a steering angle, a yaw rate and a lateral acceleration of the motor vehicle, and a controller configured to control respective positions of a steering wheel and an accelerator pedal of the motor vehicle;

determining a course curvature, via the controller, based on the sensed steering angle, yaw rate and lateral acceleration of the motor vehicle;

controlling the steering wheel and accelerator pedal positions, via the controller, so as to thereby cause the motor vehicle to automatically execute the drifting technique along a course curvature such that resistance feedback for learning the drifting technique is provided to the driver by at least one of the steering wheel and the accelerator pedal; and adapting the course curvature via a manually applied torque.

10. The method according to claim 9, wherein the automatic execution of the drifting technique is continued even if the rear of the motor vehicle breaks out as a result of an acceleration burst by the driver or by the drifting assistance system.

11. The method according to claim 9, wherein activating the drifting assistance systems further includes the acts of:

determining a side slip angle of a vehicle-fixed reference point as estimated during the activation; and controlling the estimated side slip angle to a driver-adjustable required value by way of acceleration or deceleration of the vehicle.

12. The method according to claim 9, further comprising the act of:

outputting acoustically and/or optically actuating variables of the drifting assistance system.

13. The method according to claim 9, correcting, by way of the manually applied torque, the automatic steering movements.

\* \* \* \* \*